United States Patent [19]
Nichols

[11] Patent Number: 6,058,888
[45] Date of Patent: May 9, 2000

[54] DETACHABLE HARNESS ASSEMBLY FOR SECURING ANIMALS ON A TREADMILL

[76] Inventor: Don Edward Nichols, 260 Crestmoor Cir., Pacifica, Calif. 94044

[21] Appl. No.: 09/261,011

[22] Filed: Mar. 1, 1999

[51] Int. Cl.[7] .................................................. A01K 13/00
[52] U.S. Cl. ............................................................ 119/702
[58] Field of Search .................................. 119/600, 700, 119/702, 703, 712, 753, 756, 757, 768

[56] References Cited

U.S. PATENT DOCUMENTS

| | | | |
|---|---|---|---|
| 293,839 | 2/1884 | Addison . | |
| 1,016,729 | 2/1912 | Barrett . | |
| 2,155,684 | 4/1939 | Richards | 119/29 |
| 2,804,845 | 9/1957 | Plumley et al. . | |
| 2,902,976 | 9/1959 | Wilson . | |
| 3,524,434 | 8/1970 | Finley . | |
| 3,744,457 | 7/1973 | Heine et al. . | |
| 4,095,561 | 6/1978 | Ruetenik | 119/29 |
| 4,743,009 | 5/1988 | Beale | 272/69 |
| 4,898,378 | 2/1990 | Edwards | 272/69 |
| 5,114,390 | 5/1992 | Tribelhorn, Jr. | 482/54 |
| 5,178,098 | 1/1993 | Samberg | 119/702 |
| 5,277,150 | 1/1994 | Rhodes | 119/700 |
| 5,329,882 | 7/1994 | Hunt | 119/757 |
| 5,488,926 | 2/1996 | Hunt | 119/756 |
| 5,713,308 | 2/1998 | Holt, Jr. | 119/856 |
| 5,960,746 | 10/1999 | Salts | 119/756 |

*Primary Examiner*—Thomas Price
*Attorney, Agent, or Firm*—Goldstein & Canino

[57] ABSTRACT

A harness assembly for securely holding an animal on top of a treadmill and allowing the animal to exercise thereupon. The harness assembly comprises an anchor unit for attaching harness assembly to the sidearm of the treadmill, a substantially L-shaped arm mounted from the anchor unit, a belt having a clasp suspended downward from the arm, and a harness fitted onto the animal. The harness has an attachment handle that is secured to the clasp to securely hold the animal on top of the treadmill. A second embodiment allows the harness assembly to be secured to the floor of the treadmill, adjacent to the track.

7 Claims, 5 Drawing Sheets

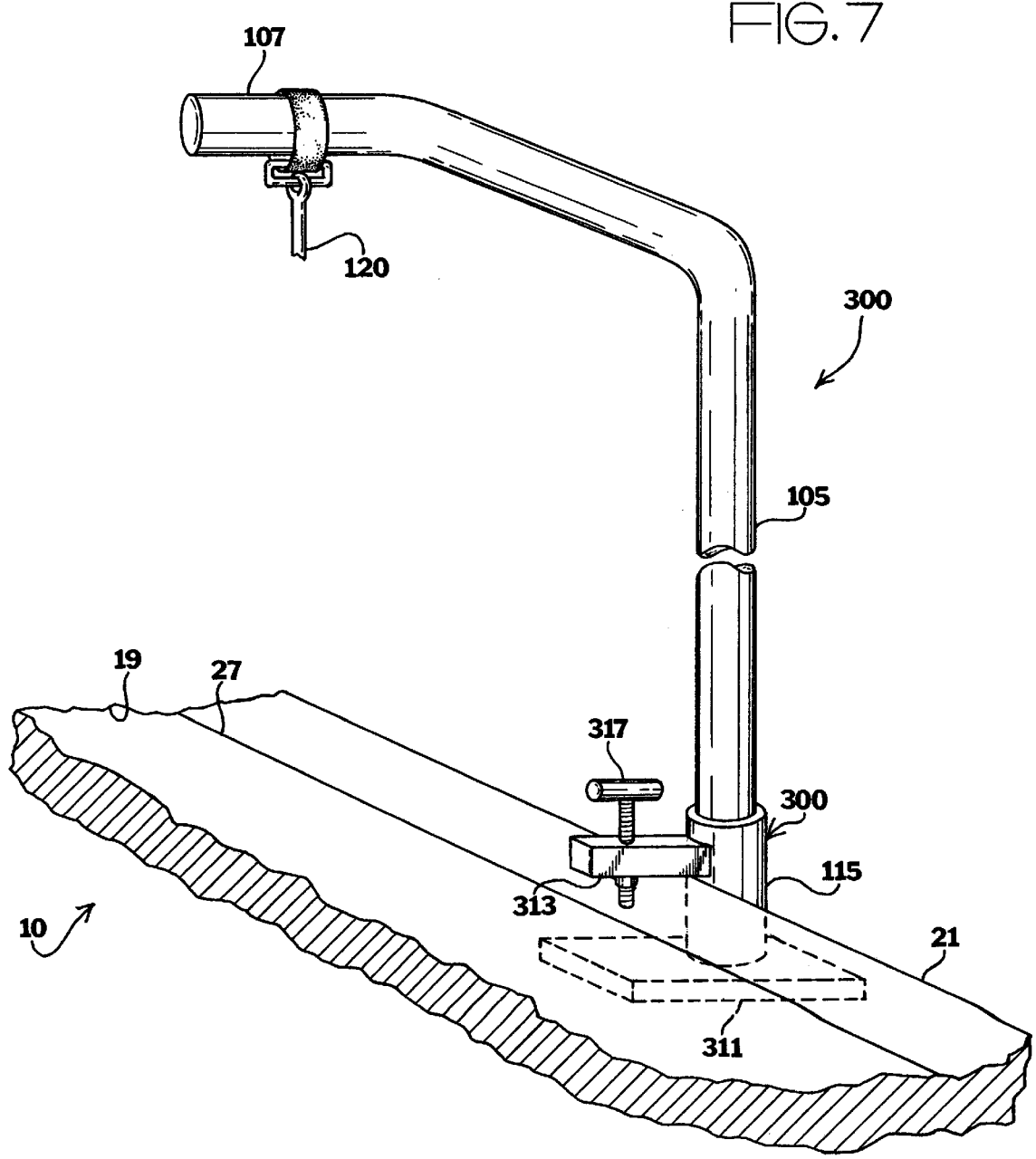

DETACHABLE HARNESS ASSEMBLY FOR SECURING ANIMALS ON A TREADMILL

BACKGROUND OF THE INVENTION

The invention relates to a harness assembly for supporting an animal on a treadmill's track. More particularly, the invention relates to a harness assembly that is detachably mounted to a treadmill for supporting animals of various sizes on top of the treadmill.

To remain in good health and to ensure longer and healthier lives, regular exercise is typically recommended. In particular, it is beneficial to engage in cardio-vascular exercise, such as calisthenics, aerobics or jogging, to receive the benefits of a work-out without over-exerting oneself. Regularly exercising not only keeps human in good health, but also animals.

Unfortunately, exercising animals is not an easy task. Unlike sports clubs and gymnasiums, which are readily available for human beings, there are very few places where animals can exercise under the watchful eyes of experienced trainers. As a result, people who own animals must either exercise their pets themselves, or hire someone else to exercise the pets.

One of the most popular ways for exercising pets is to go jogging or running with the pets while leashed, wherein the leash ensures that the pet jogs along with its human companion. Unfortunately, bad weather can make it difficult to go jogging or running, and prevent one from exercising their pets. To facilitate humans in exercising indoors, jogging machines (commonly known as treadmills), which simulate the experience of jogging or running outdoors, are readily available.

Some have suggested jogging machines for animals that resemble the treadmills used by humans. For example, U.S. Pat. No. 5,277,150 to Rhodes discloses an exercise assembly for dogs that comprises a support frame and a treadmill track mounted on the support frame, wherein the treadmill track moves along its length. U.S. Pat. No. 5,114,390 to Tribelhorn, Jr. discloses a treadmill device for exercising and conditioning a plurality of sheep simultaneously. U.S. Pat. No. 4,095,561 to Ruetenik discloses an animal exercising apparatus comprising a towing package, a manual scraper and container, removable side panel inserts, breast and butt restraining straps, and a variable speed motor.

While these devices may provide a means for exercising animals, they require considerable storage space. Additionally, these devices have complicated structures and are expensive to construct. Consequently, while these prior art units may be suitable for the particular purpose employed, or for general usage, they would not be as suitable for the purposes of the present invention as disclosed hereinafter.

SUMMARY OF THE INVENTION

It is an object of the invention to provide a harness assembly that securely holds an animal during their usage of a treadmill.

It is another object of the present invention to provide a detachable safety harness that is detachably mounted to the sidearm of a treadmill. Accordingly, the present invention discloses a harness assembly that comprises an anchor unit that affixes onto the sidearm of the treadmill, an L-shaped rod housed within the anchor unit and a belt suspended from the L-shaped rod. The belt has an attachment clasp which is removably attached to a harness worn by the animal for ensuring safe use of the treadmill by the animal.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

The above and other aspects, features and advantages of the present invention will be more apparent from the following detailed description thereof, which is presented in conjunction with the following drawings, wherein corresponding reference characters indicate corresponding components throughout the drawing figures.

FIG. 7 provides a diagrammatic perspective view of a second embodiment of the harness assembly mounted on a floor of a treadmill.

DETAILED DESCRIPTION OF THE PREFERRED EMBODIMENTS

Figure 1:
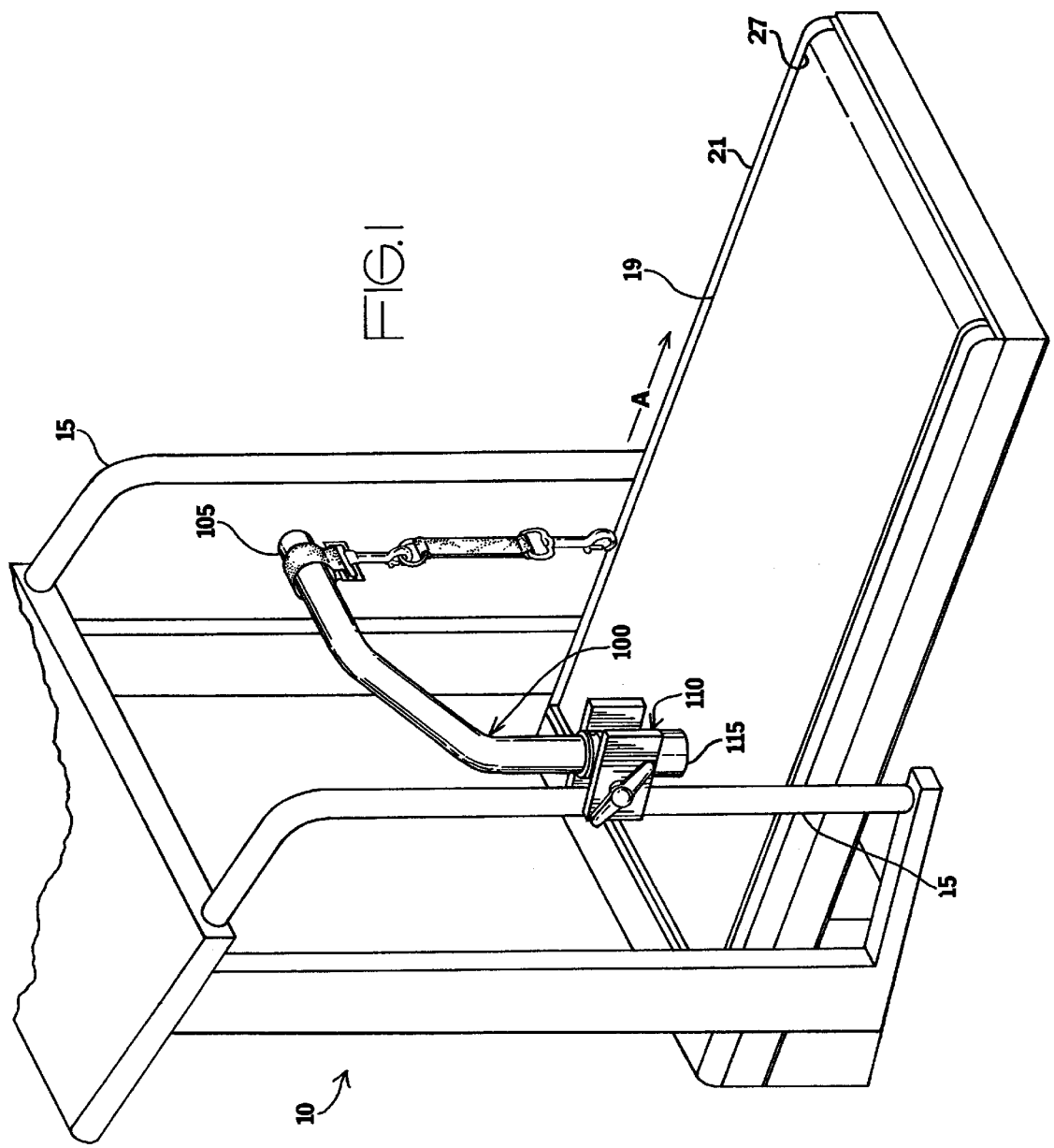
FIG. 1 provides a diagrammatic perspective view of the harness assembly mounted on a sidearm of a treadmill.

FIG. 1 shows a treadmill 10 with a pair of sidearms 15, and a track 19 that generally moves rearward in the direction of arrow A. It is well known that when a person runs, his feet push against the ground to propel him forward. Consequently, when the user is on the treadmill 10, his forward motion is balanced by the rearward movement of the track 19. The rearward motion of the track 19 ensures that the user remains on the treadmill 10 despite his feet pushing him forward while jogging. The sidearm 15 extend upward alongside the track 19 to help the user balance while running upon the track 19.

According to the invention, a harness assembly 100 is attached to one of the sidearms 15. The harness assembly 100 comprises an arm 105 that is mounted from within an anchor unit 110. The anchor unit 110 is provided with an anchor sleeve 115, which securely holds the arm 105 therein.

Figure 2:
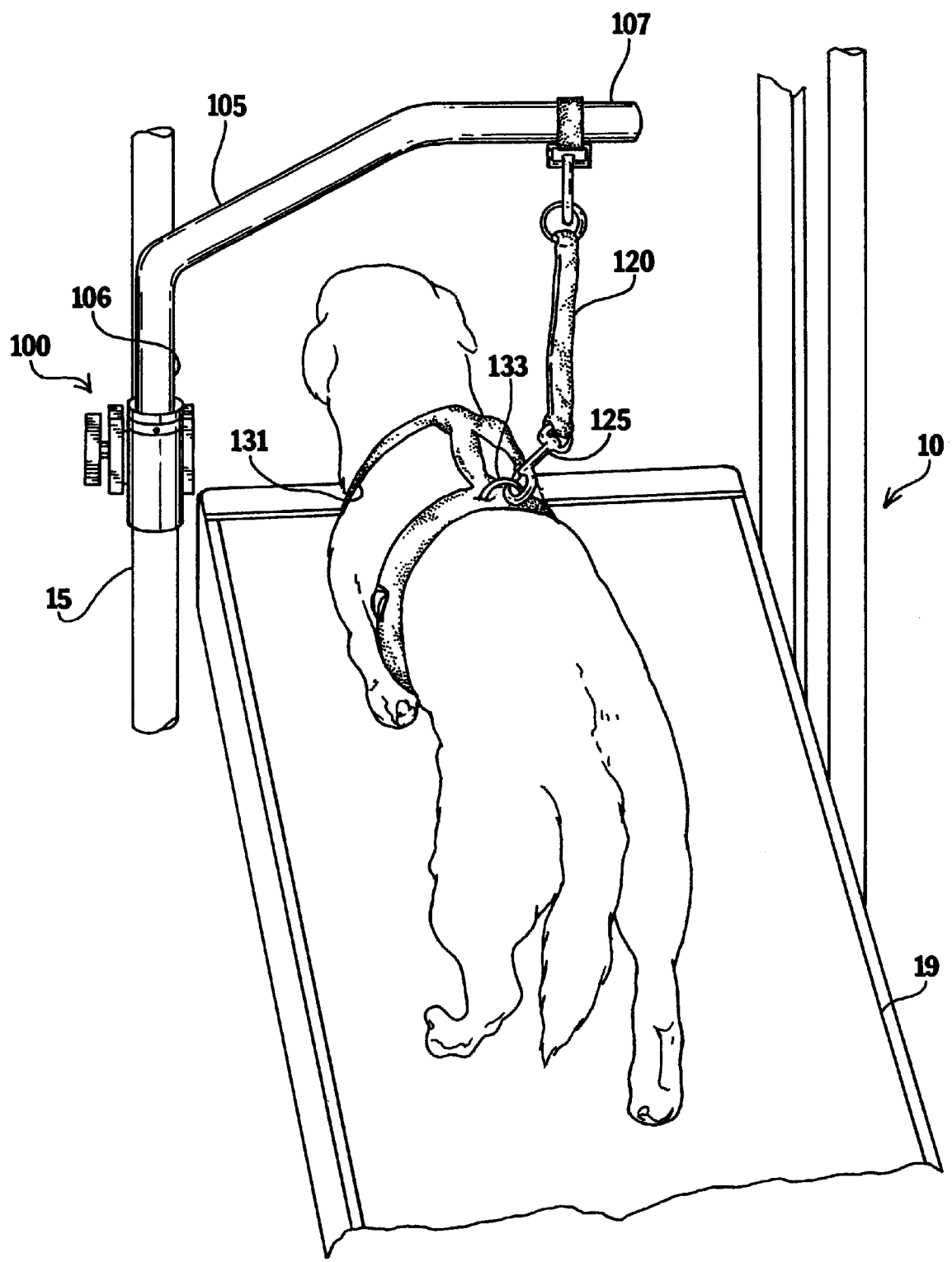
FIG. 2 provides a diagrammatic perspective view of the harness assembly securing an animal thereon.
Figure 5:
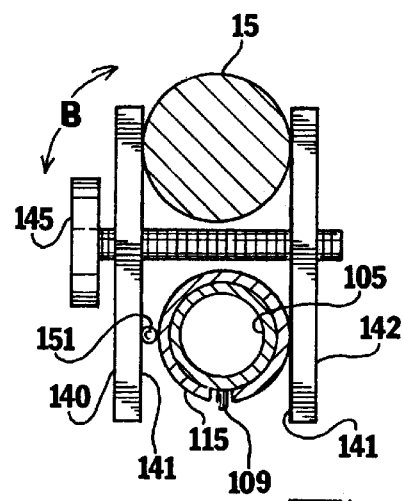
FIG. 5 provides a sectional view from the top taken in the direction of arrows 5—5 in FIG. 4.

As shown in FIG. 2, the arm 105 is substantially L-shaped and has a vertical portion 106 which attaches within the anchor sleeve 115 and a horizontal portion 107 that lies parallel to the track 19 when the harness assembly 100 is mounted to the treadmill 10. Referring momentarily to FIG. 5, the arm 105 is tubular for ensuring that the harness assembly 100 is lightweight and easy to handle. The anchor sleeve 115 is slightly larger in diameter than the arm 105 to allow secure attachment of the arm 105 therein.

The horizontal portion 107 of the arm 105 has a belt 120 suspended downward therefrom. The belt 120 is provided with a clasp 125. According to the invention, a harness 131 is fitted onto the animal. The harness 131 is provided with an attachment handle 133, which enables the clasp 125 to attach thereto.

Figure 3:
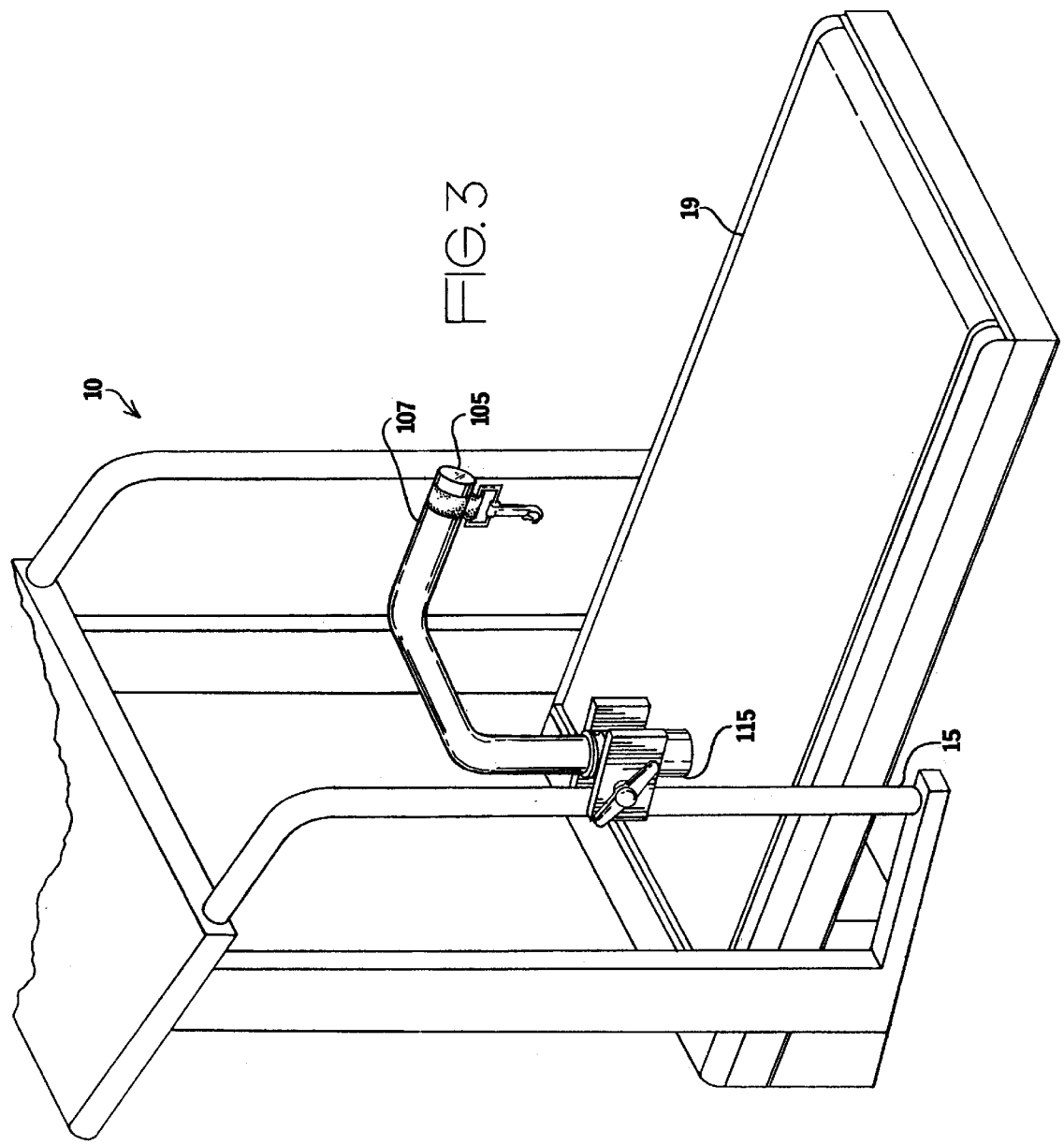
FIG. 3 provides a perspective view of the harness assembly, wherein the arm is turned away from the track of the treadmill.

As shown in FIG. 2, when the harness assembly 100 is being used to hold the animal on the track 19, the arm 105 extends across the width of the track 19. On the other hand, when the treadmill 10 is not being used to exercise an animal, the arm 105 is moved away from the track 19, as shown in FIG. 3.

Once the animal is secured to the harness assembly 100, the treadmill 10 may be turned "on", such that the track 19 becomes mobile in the rearward direction. The rearward motion of the track 19 forces the animal to move its legs, such that the animal pushes itself forward to avoid falling of the treadmill 10.

Figure 4:
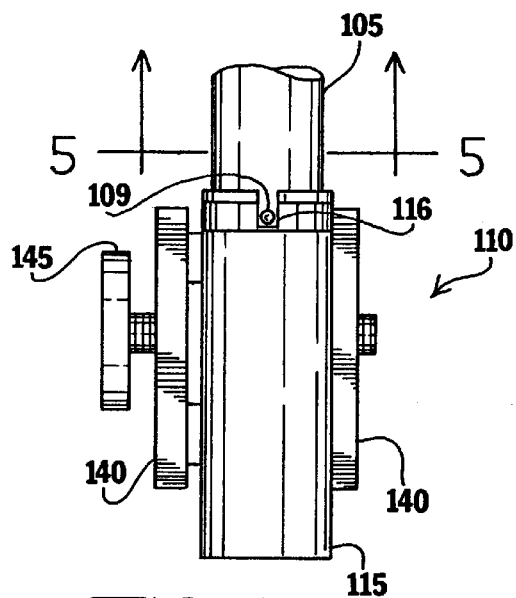
FIG. 4 provides a front elevational view of the anchor unit.

As shown in FIG. 4, the anchor unit 110 comprises a left plate 140, a right plate 142, and a fastening mechanism 145 that securely holds the left plate 140 and the right plate 142 together. According to the preferred embodiment, the fastening mechanism 145 is a bolt. The anchor unit 110 is firmly mounted onto the sidearm 15 of the treadmill 10 by tightening the fastening mechanism 145 thereon.

As shown in FIG. 5, the left plate 140 and the right plate 142 each has an interior surface 141. The interior surface 141 of right plate 142 has the anchor sleeve 115 securely mounted thereon. The anchor unit 110 has a hinge 151, which attaches the left plate 140 to the anchor sleeve 115. As a result, the left plate 140 is capable of swinging in the direction of arrow B for fitting the anchor unit 110 onto the sidearm 15 of the treadmill 10.

Figure 6:
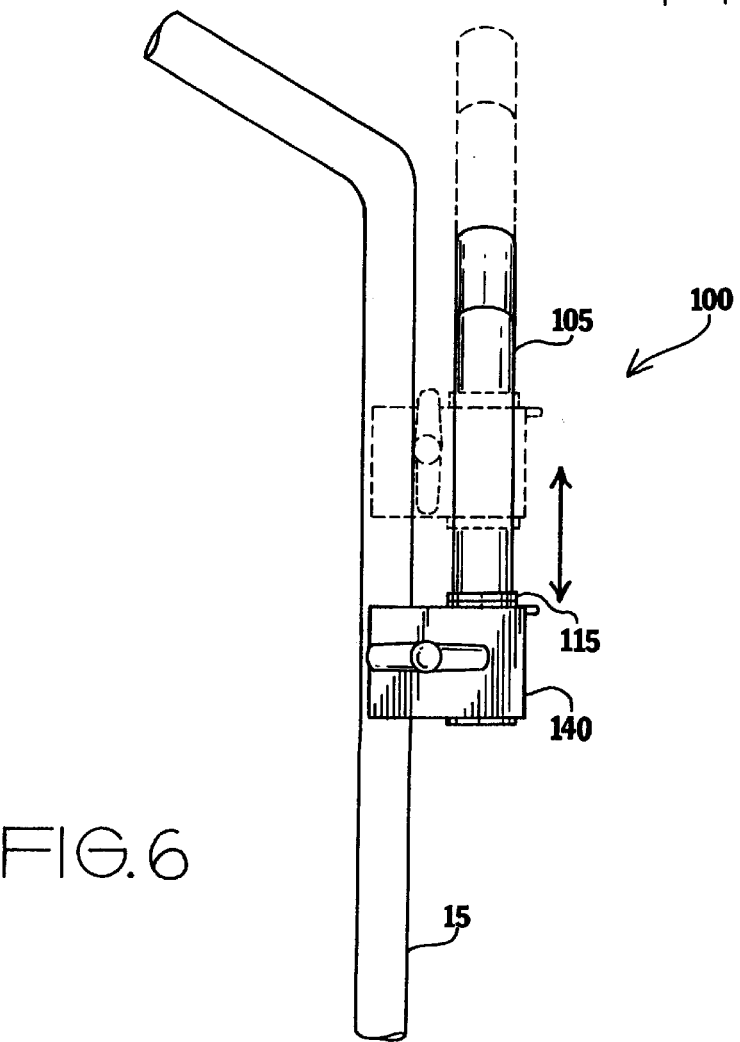
FIG. 6 provides a side elevational view of the harness assembly, wherein the height of the harness assembly may selectively be adjusted along the length of the sidearm of the treadmill.

As shown in FIG. 6, the harness assembly 100 can selectively be raised or lowered along the entire length of the sidearm 15, which is advantageous in that it allows usage of the treadmill 10 by animals of varying heights. To move the harness assembly 100 upward or downward, the fastening mechanism 145 is loosened and the anchor unit 110 is correspondingly moved upward or downward. When the desired height has been achieved, the fastening mechanism 145 is firmly tightened onto the sidearm 15.

As shown in FIG. 4, the L-shaped arm 105 is provided with a pin 109 and the anchor sleeve 115 has a slit 116 that securely houses the pin 107 therein for ensuring that the arm 105 remains firmly extended across the width of the track 19 while the animal is on the track 19.

FIG. 7 shows a second embodiment of the present invention. Referring momentarily to FIG. 1, the treadmill 10 has a floor frame 27 that lies adjacent to the track 19, wherein the floor frame 27 is stationary while track 19 may be mobile. The floor frame 27 has a side wall 21. According to the second embodiment, the harness assembly 300 is provided with a floor clamp 300, which is affixed from the side onto the floor frame 27.

The floor clamp 300 comprises a sleeve 115 mounted with a bottom plate 311 and a top support 313. The top support 313 is provided with a fastening screw 317 thereon. To mount the harness assembly 300 to the floor of the treadmill 10, the bottom plate 311 is placed beneath the track 19, such that the top support 313 lies on top of the floor frame 27. The floor clamp 300 is pushed towards the track 19 and when the sleeve touches the side walls 21, the floor clamp 300 is secured to the floor frame 27 by tightening the fastening screw 317 such that it securely clasps the floor frame 27. Once the fastening screw 317 is clasped onto the floor frame 27, the harness assembly 300 is secured on top of the treadmill 10.

Similar to the first embodiment, the harness assembly 300 of the second embodiment has a sleeve 115 that securely houses an arm 105 with a vertical and a horizontal portion therein. The horizontal portion 107 has a belt 120 suspended therefrom. As shown in FIG. 2, the belt has a clasp attached thereto. The clasp is secured to a harness that is fitted onto an animal, wherein the harness has an attachment handle which is secured to the clasp, for securely fastening the animal on top of the treadmill.

Many specific details contained in the above description merely illustrate some preferred embodiments and should not be construed as a limitation on the scope of the invention. Accordingly, many other variations are possible within the spirit of the present invention, limited only by the scope of the appended claims.

What is claimed is:

1. A harness assembly attached to a sidearm of a treadmill for securely holding an animal on the treadmill having a track and at least one sidearm along side the track for helping a person balance while running upon the track, said harness assembly comprising:

an anchor unit, for attaching said harness assembly to the sidearm of the treadmill, comprising a pair of plates, said plates having an interior surface, and a fastening mechanism that extends through the pair of plates for tightening the pair of plates on to the sidearm of the treadmill;

a substantially L-shaped arm firmly housed within said anchor unit, said arm having a vertical portion and a horizontal portion;

a belt suspended from said horizontal portion of said L-shaped arm;

a clasp that is attached to the belt; and a harness that is fitted onto an animal, said harness having an attachment handle, said attachment handle being secured to said clasp, such that the animal with the harness is securely fastened to said harness assembly on top of the treadmill.

2. The harness assembly of claim 1, wherein said anchor unit has an anchor sleeve mounted to the interior surface of one of said pair of plates, said anchor sleeve securely holding the vertical portion of the L-shaped arm therein.

3. The harness assembly of claim 2, wherein said anchor sleeve has a diameter that is slightly larger than the diameter of the vertical portion of the L-shaped arm for ensuring secure attachment of the L-shaped arm therein.

4. The harness assembly of claim 3, wherein said fastening mechanism is a bolt that extends through the pair of plates.

5. The harness assembly of claim 4, wherein the anchor unit further comprises a hinge mounted to the interior portion of second one of said pair of plates and to the anchor sleeve for allowing the second one of the pair of plates to hingeably swing for fitting the anchor unit onto the sidearm of the treadmill.

6. The harness assembly of claim 5, wherein said arm has a pin and said anchor sleeve has a slit that houses the pin therein for ensuring that said L-shaped arm remains firmly extended across the treadmill.

7. The harness assembly of claim 6, wherein said L-shaped arm is constructed from a hollow tube to ensure that the harness assembly is light weight and easy to handle.

* * * * *